(12) United States Patent
Hayashi et al.

(10) Patent No.: US 6,356,835 B2
(45) Date of Patent: *Mar. 12, 2002

(54) MAP INFORMATION DISPLAY DEVICE FOR NAVIGATION APPARATUS

(75) Inventors: Katsuyoshi Hayashi; Kenichiro Yano; Makoto Hijikata, all of Kawagoe (JP)

(73) Assignee: Pioneer Electronic Corporation, Tokyo-to (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,738

(22) Filed: Mar. 5, 1999

(30) Foreign Application Priority Data

Mar. 6, 1998 (JP) .............................. 10-055120

(51) Int. Cl.[7] .......................... G01C 21/00; G06G 7/78; G08G 1/123
(52) U.S. Cl. ..................... 701/208; 701/211; 701/212; 340/988; 340/990; 340/995
(58) Field of Search ................................. 701/208, 210, 701/211, 212; 340/988, 990, 995

(56) References Cited

U.S. PATENT DOCUMENTS

| 5,555,354 A | | 9/1996 | Strasnick et al. ............ 395/127 |
| 5,890,088 A | * | 3/1999 | Nimura et al. ............... 701/211 |
| 5,913,918 A | * | 6/1999 | Nakano et al. ............... 701/208 |
| 5,917,436 A | * | 6/1999 | Endo et al. ................... 340/995 |
| 5,945,927 A | * | 8/1999 | Nakayama et al. .......... 340/995 |
| 5,974,876 A | * | 11/1999 | Hijikata et al. ............. 73/178 R |
| 6,018,697 A | * | 1/2000 | Morimoto et al. ........... 701/209 |
| 6,041,281 A | * | 3/2000 | Nimura et al. ............... 701/211 |

FOREIGN PATENT DOCUMENTS

| EP | 0 660 290 A1 | 6/1995 |
| EP | 0 738 874 A2 | 10/1996 |
| EP | 0 738 876 A2 | 10/1996 |
| EP | 0 766 216 A1 | 4/1997 |
| EP | 0 802 516 A2 | 10/1997 |

* cited by examiner

Primary Examiner—Jacques H. Louis-Jacques
Assistant Examiner—Brian J. Broadhead
(74) Attorney, Agent, or Firm—Finnegan, Henderson, Farabow, Garrett & Dunner, L.L.P.

(57) ABSTRACT

In a map information display device, the map data extracting unit extracts character data corresponding to characters from map data corresponding to the map, and the map data converting unit converts the map data including no character data to a bird's-eye-view map data. The character data converting unit selects designated character data from the extracted character data and converts the character data other than the designated character data to bird's-eye-view character data. Then, the combining unit combines the bird's-eye-view character data, the bird's-eye-view map data and the designated character data to produce combined bird's-eye-view data. Then, the display unit displays the map of bird's-eye-view using the combined bird's-eye-view data.

13 Claims, 10 Drawing Sheets

MAP INFORMATION DISPLAY DEVICE FOR NAVIGATION APPARATUS

BACKGROUND OF THE INVENTION

1. Field of the Invention

This invention relates to a navigation apparatus which displays a travel route of a moving object such as a vehicle and famous buildings or place names around the route together with map thereby to assist the movement of the moving object. More specifically, this invention relates to a bird's-eye-view display of the map information in such a navigation apparatus.

2. Description of the Prior Art

Recently, there is known a navigation apparatus as a position measurement apparatus for a moving object such as a vehicle, an airplane and a vessel. The navigation apparatus generally displays a position mark of the moving object with a map around the vehicle position so as to guide the driver to the destination. The navigation apparatuses installed in a vehicle are roughly classified into two types: a stand-alone type navigation apparatus and a GPS (Global Positioning System) navigation apparatus. A stand-alone type navigation apparatus derives the travel direction data and the travel distance data of the vehicle by means of a speed sensor and an angular velocity sensor installed in the vehicle, successively adds those data to a reference position to calculate the current position of the vehicle, and then displays the map with the position mark of the vehicle on a display device based on the current position thus calculated. On the other hand, a GPS navigation apparatus receives measurement radio waves from a plurality of GPS satellites launched into space via a GPS receiver, calculates the current position of the vehicle from the received data using a three- or two-dimensional measurement method, and then displays the current position mark and map on a display device.

Nowadays, a so-called hybrid type vehicle navigation apparatus, which has functions of both the stand-alone type and the GPS type navigation apparatus, is known. Further, some navigation apparatuses are capable of displaying a preset travel route of the vehicle on a map together with names of buildings or places located around the preset travel route. Those navigation apparatuses enable the user (driver) to recognize the current position of the vehicle in connection with the map around there so that the user can readily and safely reach the destination without losing the way, even if he or she goes there for the first time.

In those navigation apparatuses, a so-called bird's-eye-view display of the map had been employed recently, so as to enlarge the range of displayed map and achieve more natural and real map display. The bird's-eye-view display is a map display method which shows the map as if the user is viewing the area obliquely downwardly from a midair viewing position (namely, displays a map in a one-point perspective projection view from a midair view point). The bird's-eye-view display is generally broadly used in a flight simulator, for example.

The conventional vehicle navigation apparatus having the bird's-eye-view display function generally converts the map including roads together with characters to be displayed in the map (for example, the place name display of the target places and route display of the route points to be passed by) into the bird's-eye-view diagram and displays it. Namely, not only the map but characters or marks associated with the map are shown in the bird's-eye-view manner. However, in such cases, it is difficult to show certain character string on the travel route which is of special importance, such as the target objects to which the driver's attention should be paid, in a manner distinguished from the other characters.

SUMMARY OF THE INVENTION

It is an object of the present invention to provide a map information display device for use in a vehicle navigation apparatus having a bird's-eye-view display function, which is capable of displaying some important targets and the like, to which the driver's attention should be paid, in a distinguished manner.

According to one aspect of the present invention, there is provided a map information display device for use in a navigation apparatus which displays map to assist a travelling of a moving object, the device including: a map data extracting unit for extracting character data corresponding to characters from map data corresponding to the map; a map data converting unit for converting the map data including no character data to a bird's-eye-view map data; a character data converting unit for selecting designated character data from the extracted character data and for converting the character data other than the designated character data to birds-eye-view character data; a combining unit for combining the bird's-eye-view character data, the bird's-eye-view map data and the designated character data to produce combined bird's-eye-view data; and a display unit for displaying the map of bird's-eye-view using the combined bird's-eye-view data.

In accordance with the map information display device thus configured, the map data extracting unit extracts character data corresponding to characters from map data corresponding to the map, and the map data converting unit converts the map data including no character data to a bird's-eye-view map data. The character data converting unit selects designated character data from the extracted character data and converts the character data other than the designated character data to bird's-eye-view character data. Then, the combining unit combines the bird's-eye-view character data, the bird's-eye-view map data and the designated character data to produce combined bird's-eye-view data. Then, the display unit displays the map of bird's-eye-view using the combined bird's-eye-view data.

As a result, the designated data are not shown in the birds-eye-view manner differently from the other character data which are shown in the bird's-eye-view fashion. Therefore, those designated characters are distinguished from other characters on the displayed map, and the user can easily recognize those designated characters.

In a preferred embodiment, the designated character data may be designated by a user in advance. Alternatively, the designated character data may be designated in accordance with one of the following: an area where the moving object is travelling, a current time of the moving object, a travelling direction of the moving object, or a traffic information supplied from an external unit.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIGS. 8A and 8B are diagrams showing bird's-eye-view conversion processing of the character data of image font, wherein FIG. 8A shows a display area of the image font and FIG. 8B shows the image font after the bird's-eye-view conversion.

DETAILED DESCRIPTION OF THE PREFERRED EMBODIMENTS

Prior to the description of the preferred embodiment of the present invention, a general description will be given of the bird's-eye-view display of the map information, with reference to FIGS. 1 and 2.

Figure 1:
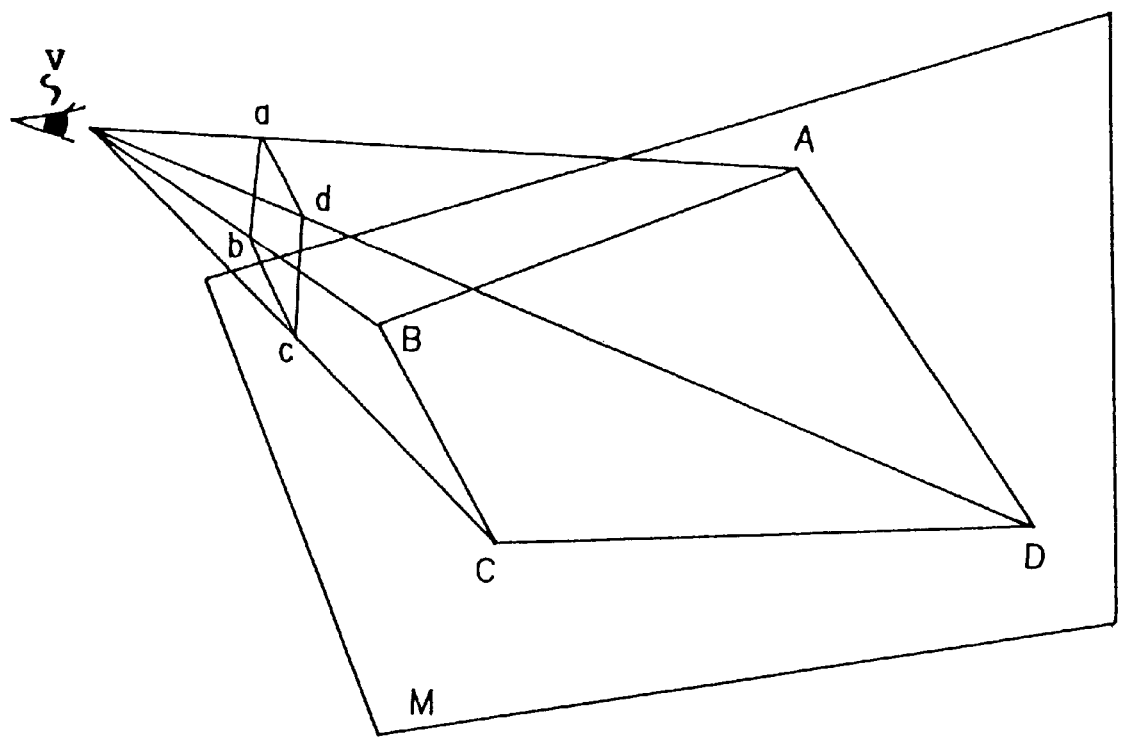
FIG. 1 is a diagram schematically showing the bird's-eye-view conversion.
Figure 2:
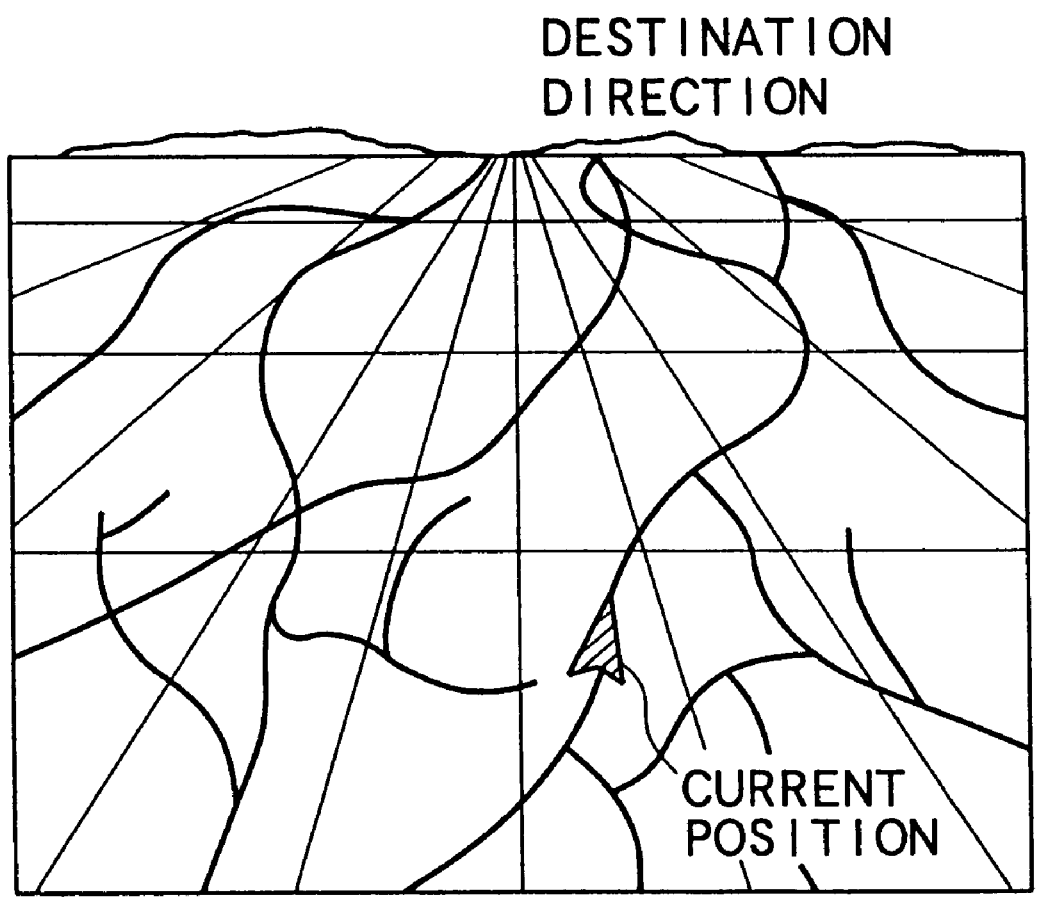
FIG. 2 is a diagram showing an example of the bird's-eye-view display.

In FIG. 1, the plane M represents a map, and the rectangle abcd represents the display range of a display device showing the map. Assuming that the viewing point is fixed at the point V in FIG. 1, the map range viewable from the viewing point V through the rectangle abcd is the trapezoid ABCD on the plane M. Namely, a far broader map area than the rectangle area abcd is viewable from the viewing point V. The bird's-eye-view displays the map image on a display device as if the viewer is viewing the map area of the trapezoid ABCD from the midair view point V.

The bird's-eye-view will be described in more detail with reference to FIG. 2. FIG. 2 shows the display example of the road map around a route from a current position of the vehicle to a destination on a display device by the bird's-eye-view display method. Namely, the view of FIG. 2 is obtained by setting the viewing point at a midair position above the current position of the vehicle on the side opposite to the side of the destination and looking down the area toward the direction of the destination. By setting the viewing point at such a position, as seen in FIG. 2, a map image is shown wherein the map gradually and successively scales down as the displayed position goes farther from the current position of the vehicle toward the destination. In other words, the area near the current vehicle position is displayed in the enlarged fashion in comparison with the planar view of the map, and hence the travel route may be displayed more broadly, up to the destination. With the use of the bird's-eye-view display, the broader map area may be displayed compared with the plane map display, and more real map display may be achieved.

Next, the preferred embodiment of the present invention will now be described below with reference to FIGS. 3 to 10. It is noted that the embodiments described below are directed to the application of the present invention to a vehicle navigation apparatus for use in a vehicle such as an automobile.

[I] Configuration of Apparatus

Figure 3:
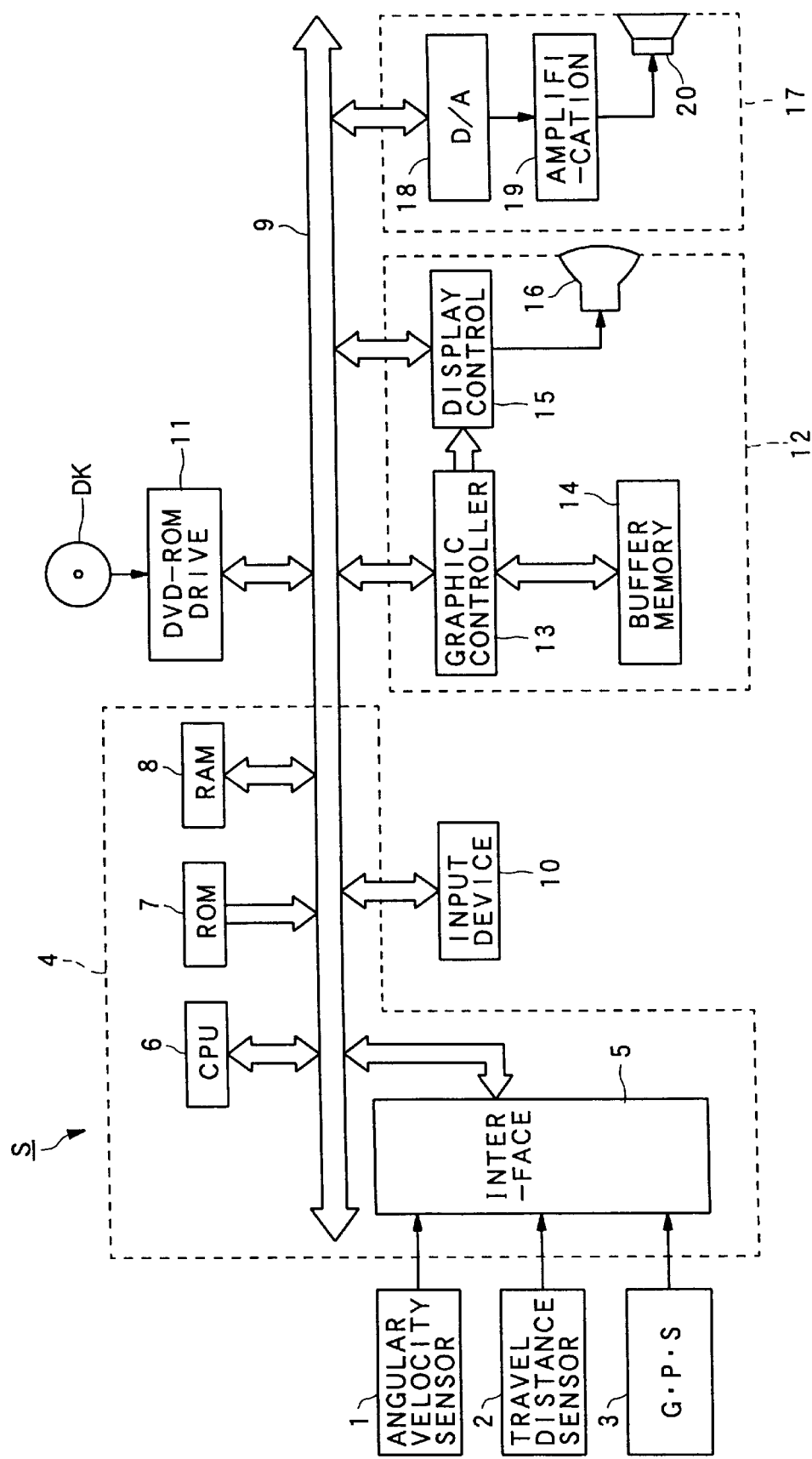
FIG. 3 is a block diagram showing a schematic configuration of a vehicle navigation apparatus according to the embodiment of the present invention.

First, the whole configuration of a vehicle navigation apparatus according to an embodiment of the invention will be described with reference to FIG. 3. As shown in FIG. 3, the vehicle navigation apparatus S includes a angular velocity sensor 1, a travel distance sensor 2, a GPS receiver 3, a system controller 4, an input device 10, a DVD-ROM drive 11, a display unit 12 and an audio reproduction unit 17. The angular velocity sensor 1 detects the angular velocity of the vehicle at the time of changing its direction, and outputs angular velocity data and relative orientation data. The travel distance sensor 2 calculates the pulse number for a single rotation of the wheel by counting the pulse number in the pulse signal outputted according to the wheel rotation, and outputs travel distance data based on the pulse number per rotation. The GPS receiver 3 receives radio waves from the GPS satellites to output GPS measurement data and absolute orientation data indicating the travel direction of the vehicle. The system controller 4 controls the navigation apparatus in its entirety on the basis of the relative orientation data, the angular velocity data, the travel distance data, the GPS measurement data and the absolute orientation data. The input device 10 may be a remote-controller device for inputting various kinds of data and instruction. The DVD-ROM drive 11 reads out, from a DVD-ROM disc DK, various data such as road data including lane number of the road, road width, etc. as well as control programs described later, and outputs them under the control of the system controller 4. The display unit 12 displays various display data under the control of the system controller 4, and the audio reproduction unit 17 reproduces and outputs various audio data under the control of the system controller 4.

The system controller 4 includes an interface 5 for performing the interface operation with the external sensors such as the GPS receiver 3, a CPU 6 for controlling the system controller 4 in its entirety, a ROM (Read Only Memory) 7 in which control programs for controlling the system controller 4 is stored, and a RAM 8 which includes non-volatile memory or the like and stores various data, such as travel route data preset by the driver via the input device 10, in a readable manner. The system controller 4 is connected to the input device 10, the DVD-ROM drive 11, the display unit 12 and the audio reproduction unit 17 via the bus line 9.

The display unit 12 includes a graphic controller 13 which totally controls the display unit 12 based on the control data fed from the CPU 6 via the bus line 9, and a buffer memory 14 which may be VRAM (Video-RAM) for temporarily storing image information in a manner being promptly displayed. Further, the display unit 12 includes a display control unit 15 which controls a display device 16 such as a liquid crystal display or a CRT (Cathode Ray Tube) to display the image data fed from the graphic controller 13.

The audio reproduction unit 17 includes a D/A converter 18 for converting the digital audio data supplied from the DVD-ROM drive 11 or the RAM 8 via the bus line 9 into an analog audio signal, an amplifier 19 for amplifying the analog audio signal outputted by the D/A converter 18, and a speaker 20 for converting the amplified analog audio signal into acoustic voice.

In this embodiment, the input device 10 is manipulated by the driver prior to the driving, and is used to designate destination, some target points and the like to be shown on the display, to which the driver's attention should be paid during the driving. The data of the target points thus inputted is temporarily stored in the RAM 8, and is read out therefrom at the timing described later.

[II] Operation

Next, the operation of the vehicle navigation apparatus according to the present invention will be described. It is noted that the operation represented by the flowcharts described below is mainly performed, by the CPU 6 or the graphic controller 13, as a part of the main navigation program that controls the whole navigation apparatus S to carry out the navigation operation. Accordingly, when a predetermined instruction operation is made by the input device 10 during the execution of the main navigation program, the operation represented by the following flowcharts are carried out. The programs corresponding to those flowcharts are stored in advance in the DVD-ROM disc DK as the control program, and are read out by the DVD-ROM drive 11 according to need.

First, the main routine of the bird's-eye-view display processing will be described with reference to FIG. 4. It is noted that steps S1 to S8 are mainly executed by the CPU 6 and steps S9 to S12 are mainly executed by the graphic controller 13.

Figure 4:
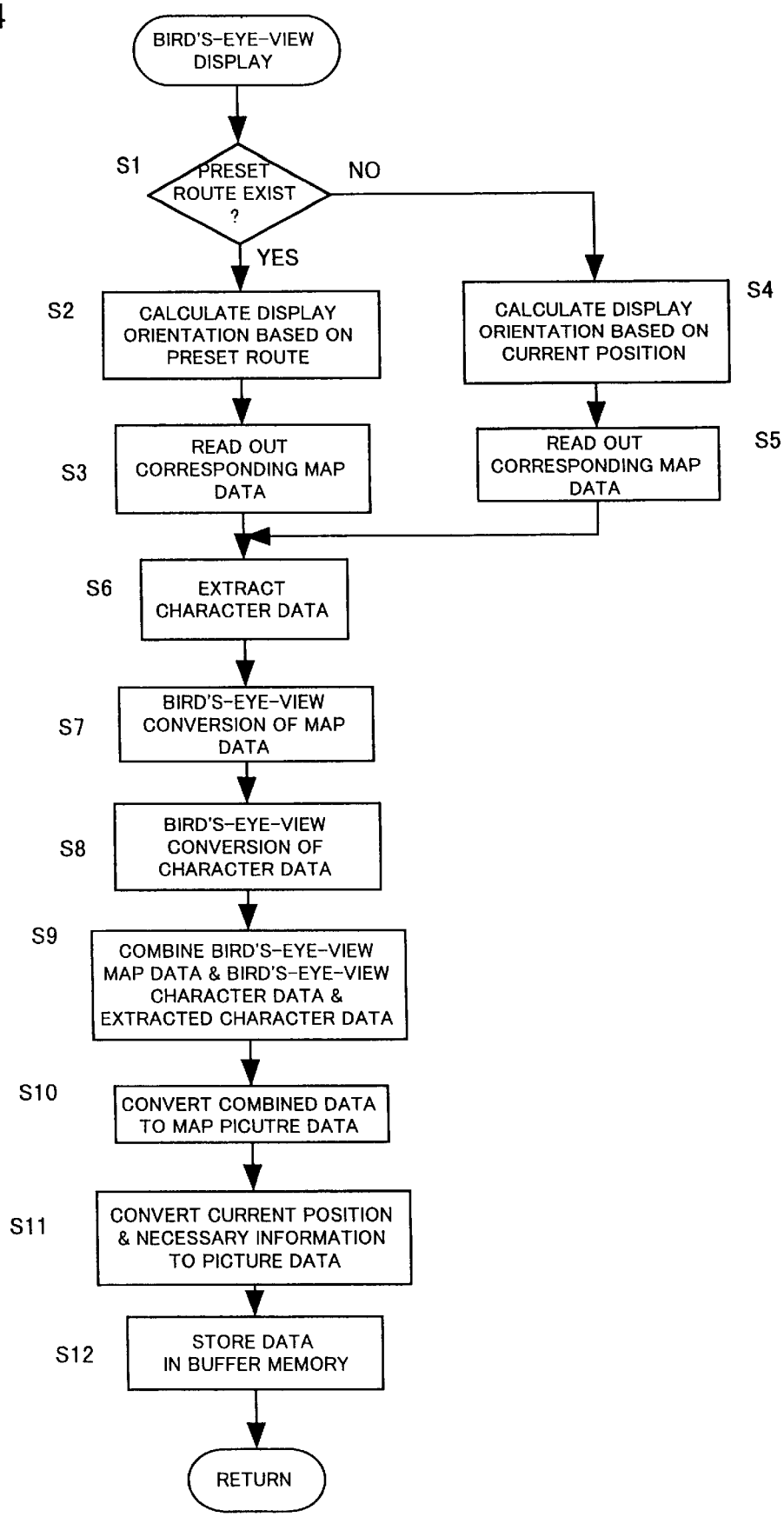
FIG. 4 is a flowchart showing a bird's-eye-view display processing according to the present invention.

When a user inputs an instruction of displaying the map by the bird's-eye-view display manner via the input device 10, the process enters the bird's-eye-view display processing shown in FIG. 4 from a given main navigation program. When the process enters the bird's-eye-view display processing, it is first determined whether or not a preset route, prescribing a pre-scheduled route from the current position to the destination, has already been set and stored in the RAM 8 (step S1). If the preset route exists (step S1; YES), the orientation of the viewing line (hereinafter referred to as "display orientation") is calculated to include the preset route so that the preset route is displayed up to as farther position as possible (step S2). Then, the corresponding map data (including associated character data such as place names and the like) covering the current position and being directed to the display orientation is read out from the DVD-ROM DK by the DVD-ROM drive 11, and is temporarily stored in the RAM 8 (step S3).

On the other hand, if no preset route exists (step S1: NO), the display orientation is calculated based on the current position and the current travel direction of the vehicle (step S4). Then, the map data covering the current position and the area in the direction of the display orientation (i.e., the travel direction of the vehicle in this case) is read out from the DVD-ROM disc DK by the DVD-ROM drive 11, and is temporarily stored in the RAM (step S5).

When necessary map data is stored in the RAM 8, then the character data included in the map data is extracted from the map data (step S6). Here, the character data may include characters representing names of places, famous facilities, roads and so on, figures representing the map marks of schools, police stations, factories and so on, and marks (landmarks) representing stores, gas stations and so on. When the character data is extracted, the map data from which the character data is extracted (i.e., including only the road map, background diagram and the like) is converted in a one-point perspective projection manner (hereinafter simply referred to as "bird's-eye-view conversion") by viewing it from a midair point above the current position of the vehicle so as to produce the bird's-eye-view map data. The bird's-eye-view map data thus produced is temporarily stored in the RAM 8 (step S7). The detail of step S7 will be described later.

When the map data after the extraction of the character data is subjected to the bird's-eye-view conversion, the bird's-eye-view conversion is carried out for the extracted character data other than the designated character data described later (which is not to be converted in the bird's-eye-view manner) in the same manner as that of step S7. Then, the bird's-eye-view character data is produced and is temporarily stored in the RAM 8 (step S8). The detail of step S8 will also be described later.

After step S8, the birds-eye-view map data and the bird's-eye-view character data, both being temporarily stored, are combined to the designated character data to produce a sheet of map picture data to be displayed on the display device 16 (step S9). Then, the combined map data is converted to the corresponding map data (step S10). Then, the current position indication corresponding to the current position of the vehicle, which is calculated by the CPU 6, and the picture representing necessary information such as the distance to the destination on the preset travel route are converted into the picture data (step S11). Finally, the map picture data produced in step S10 and the picture data produced in step S11 are temporarily stored in the buffer memory 14 (step S12). Then, the process returns to the main navigation program. Thereafter, the map picture data and the picture data are read out from the buffer memory 14 at the timings controlled by the display controller 15, and the corresponding bird's-eye-view map appears on the display device 16.

Figure 5:
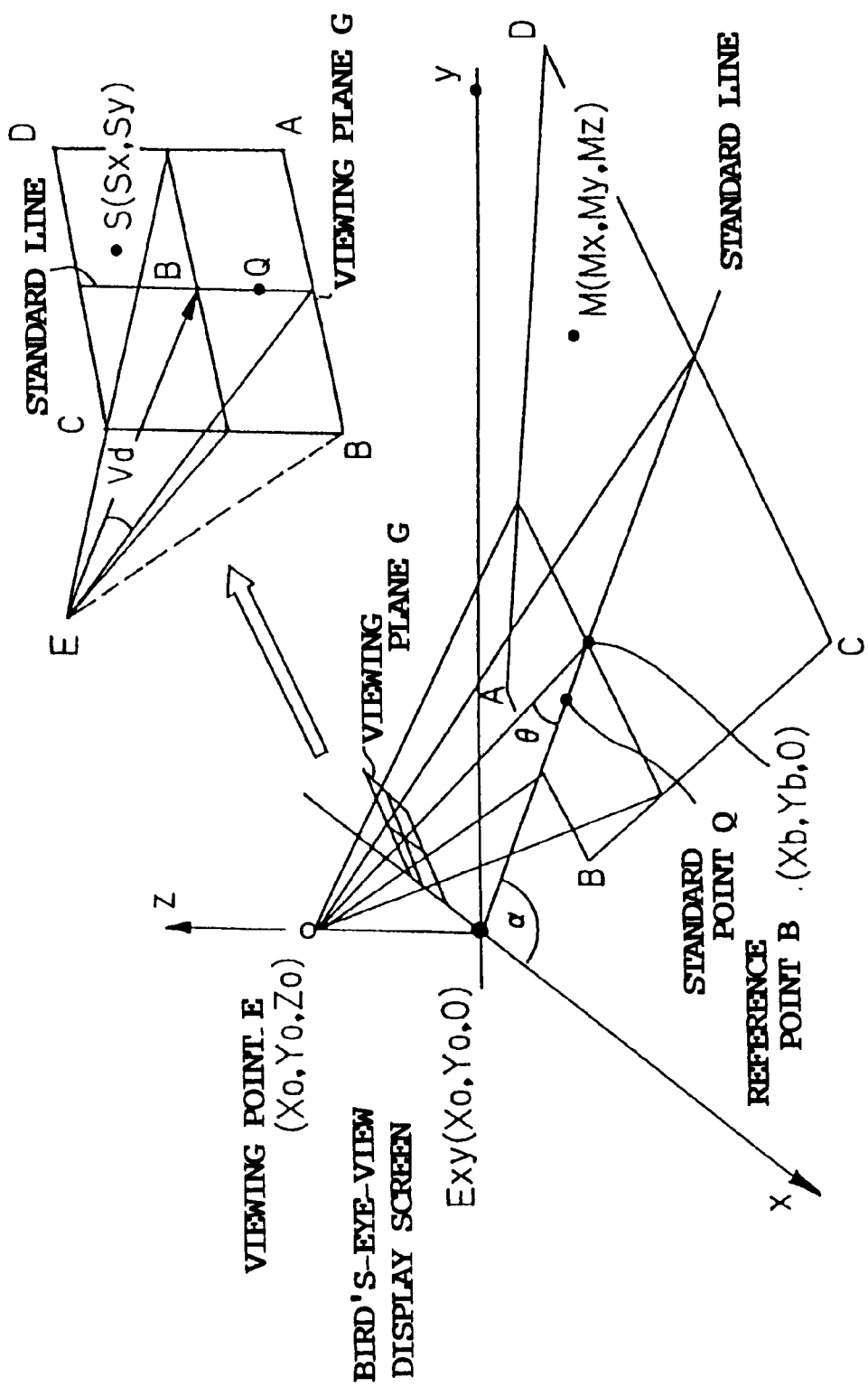
FIG. 5 is a diagram showing the manner of bird's-eye-view conversion in detail.

Next, the production of the bird's-eye-view map data performed in step S7 will be described with reference to FIGS. 5 and 6.

First, the bird's-eye-view display (one-point perspective projection display) itself will be described in more detail by referring to FIG. 5. As shown in FIG. 5, the bird's-eye-view display is the picture or image obtained by projecting a view of the map ABCD area on the X-Y plane of the XYZ coordinate system, which is viewed from the viewing point E ($X_0$, $Y_0$, $Z_0$) with a depression angle $\theta$ toward the direction of the reference point B($X_b$, $Y_b$, 0) on the X-Y plane, onto the viewing plane G which is set perpendicularly to that viewing direction. Here, it is assumed that the viewing direction from the viewing point E has the angle $\alpha$ with respect to the X-axis in the X-Y plane. Thus, the angle $\alpha$ is the display orientation calculated in step S2 or step S4. In addition, the distance between the viewing point E and the viewing plane G is expressed by Vd. The center line (vertical line) in the viewing plane G is defined as the standard line, and a predetermined standard point Q on the standard line is defined as a reference point in the one-point perspective projection. Thus, the standard point Q is on the straight line connecting the viewing point E and the reference point B on the X-Y plane serving as the map plane.

Next, the bird's-eye-view map data production processing in step S7 will be described in detail with reference to FIGS. 5 and 6. In the bird's-eye-view map data production processing, there may be employed two methods. In one method, the current position $P_0$ of the vehicle is set to the point where the vertical line from the viewing point E toward the X-Y plane (i.e., plane of map) meets the X-Y plane. In the other method, the current position $P_0$ of the vehicle is set to the standard point Q. However, there is no substantial difference in those two methods, and hence the following description is given on the assumption that the current position $P_0$ of the vehicle is set to the standard point Q and additionally that the standard point Q coincides with the reference point B.

Figure 6:
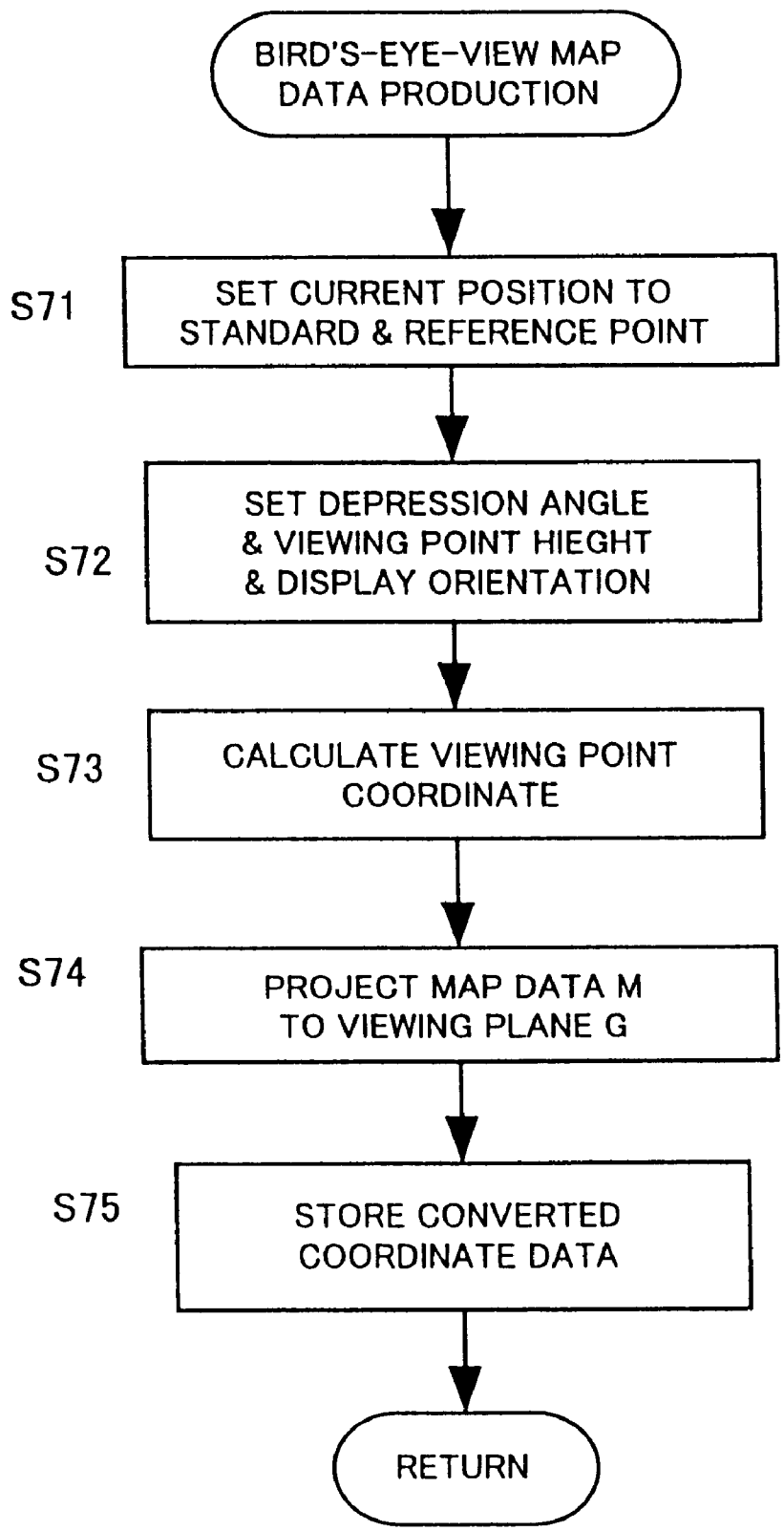
FIG. 6 is a flowchart showing the bird's-eye-view map data production in the flowchart in FIG. 4.

As shown in FIG. 6, first the current position $P_0$ is set to the reference point B and the standard point Q (step S71). Then, when the height h of the viewing position E is inputted via the input device 10, the depression angle $\theta$ is calculated based on the height h, and the display orientation $\alpha$ is read out (step S72). Then, the coordinate of the viewing point E ($X_0$, $Y_0$, $Z_0$) is calculated using the reference point B ($X_b$, $Y_b$, 0) by the following equation (step S73).

$$X_0 = X_b - h \times \cos \alpha / \tan \theta$$

$$Y_0 = Y_b - h \times \sin \alpha / \tan \theta$$

$$Z_0 = h \quad (1)$$

Then, the map data is subjected to the bird's-eye-view conversion based on the coordinate of the viewing point E thus calculated (step S74). In step S74, the following equation (determinant) (2) is used for the coordinate conversion of a point M ($M_x$, $M_y$, $M_z$) on the X-Y plane to a corresponding point S ($S_x$, $S_y$, $S_z$) on the viewing plane G:

If $$\begin{bmatrix} Ex \\ Ey \\ Ez \\ 1 \end{bmatrix} =$$

$$\begin{bmatrix} 1 & 0 & 0 & 0 \\ 0 & \sin\theta & \cos\theta & 0 \\ 0 & -\cos\theta & \sin\theta & 0 \\ 0 & 0 & 0 & 1 \end{bmatrix} \begin{bmatrix} \sin\alpha & -\cos\alpha & 0 & 0 \\ \cos\alpha & \sin\alpha & 0 & 0 \\ 0 & 0 & 1 & 0 \\ 0 & 0 & 0 & 1 \end{bmatrix} \begin{bmatrix} 1 & 0 & 0 & -X_0 \\ 0 & 1 & 0 & -Y_0 \\ 0 & 0 & 1 & -Z_0 \\ 0 & 0 & 0 & 1 \end{bmatrix} \begin{bmatrix} Mx \\ My \\ Mz \\ 1 \end{bmatrix}$$

then, $$Sx = Ex \times Vd / -Ez$$

$$Sy = Ey \times Vd / -Ez$$

$$Sz = 0$$

wherein, "Ex", "Ey", and "Ez" are coordinate values of the three-dimensional indication of the point M from the viewing point E (the length from the viewing point E is also considered), and the coordinate of the point M is first converted to the coordinate indicated by "Ex", "Ey", and "Ez" and then they are converted to the coordinate of the point S on the viewing plane G.

When the point S ($S_x$, S, 0) is calculated for one point M, the same coordinate conversion to the corresponding point S on the viewing plane S is executed for all of the points M. After the coordinate conversion is completed for all points M, the coordinates are stored in the RAM 8 (step S75), and the process goes to step S8. In this way, the bird's-eye-view conversion of the map data including no character data is completed.

Next, the processing of producing the bird's-eye-view character data performed in step S8 will be described in detail with reference to FIGS. 7, 8A and 8B. It is noted that the following description of the bird's-eye-view conversion is directed to a case where the character data is stored in the DVD-ROM DK in a form of so-called image font. Here, "image font" is aggregation of pixels (dots) on the display device 16 forming image data indicative of whole part of a character or a mark.

Figure 7:
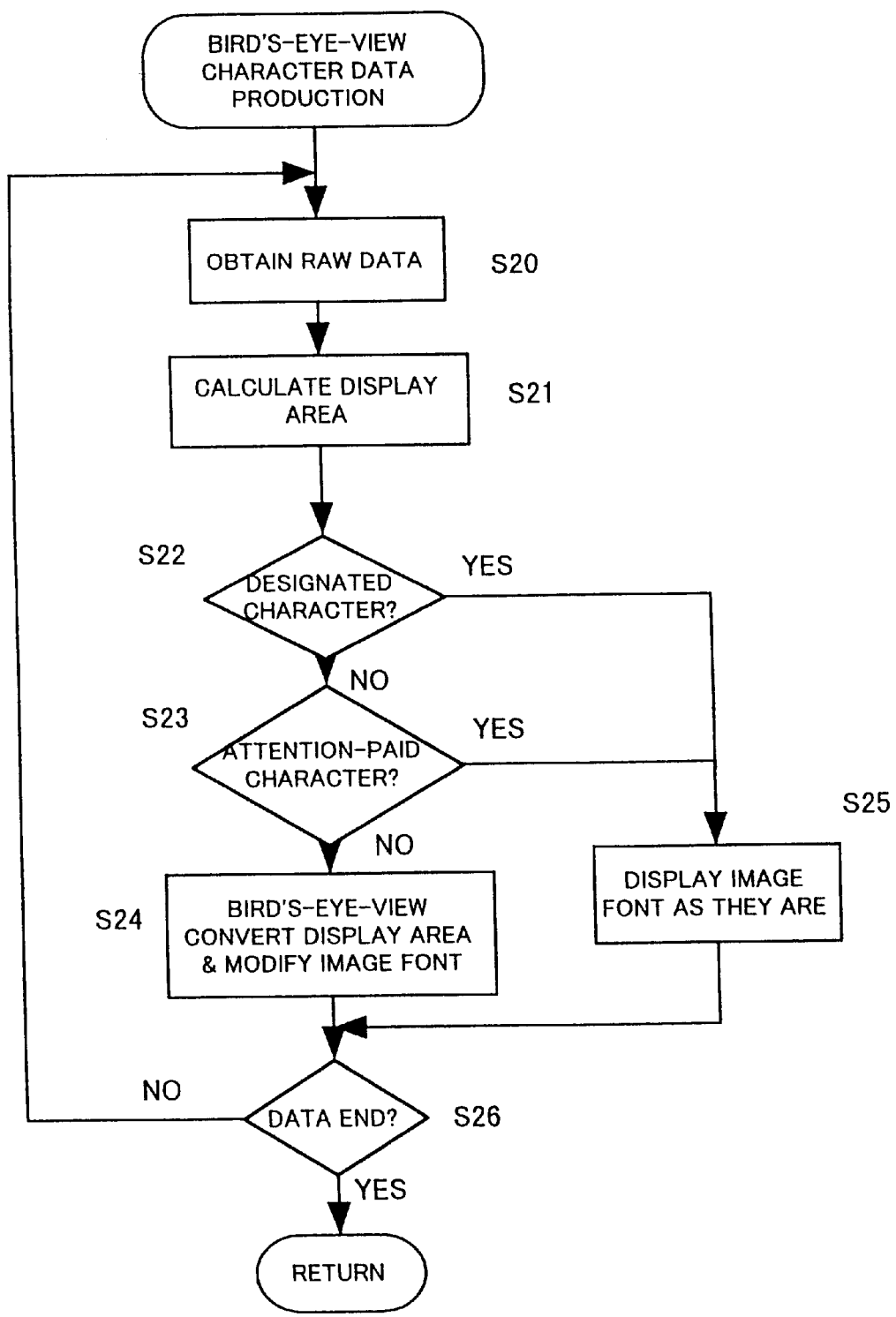
FIG. 7 is a flowchart showing the bird's-eye-view character data production step in FIG. 4.
Figure 8A:
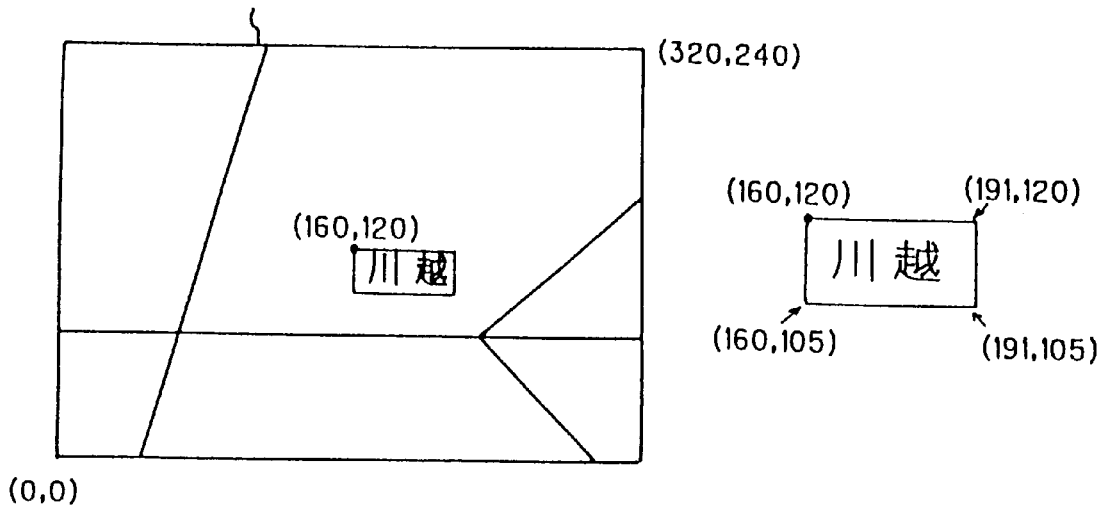
Figure 8B:
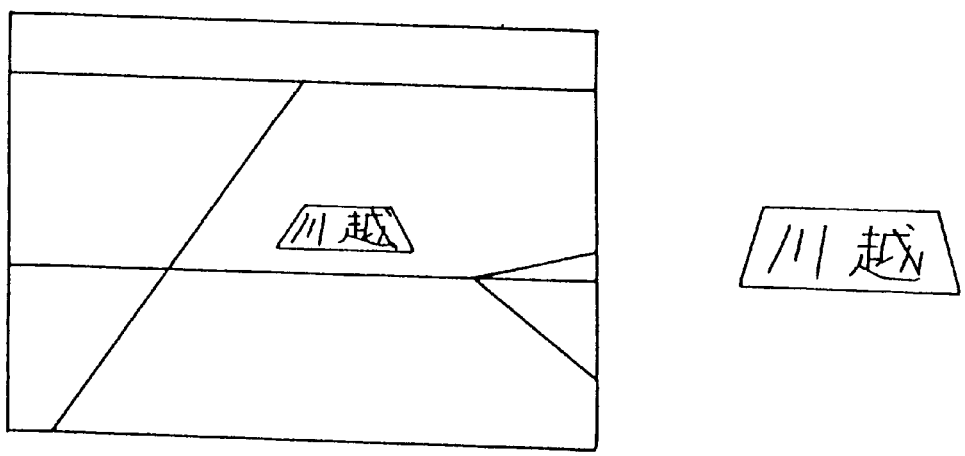
Figure 9:
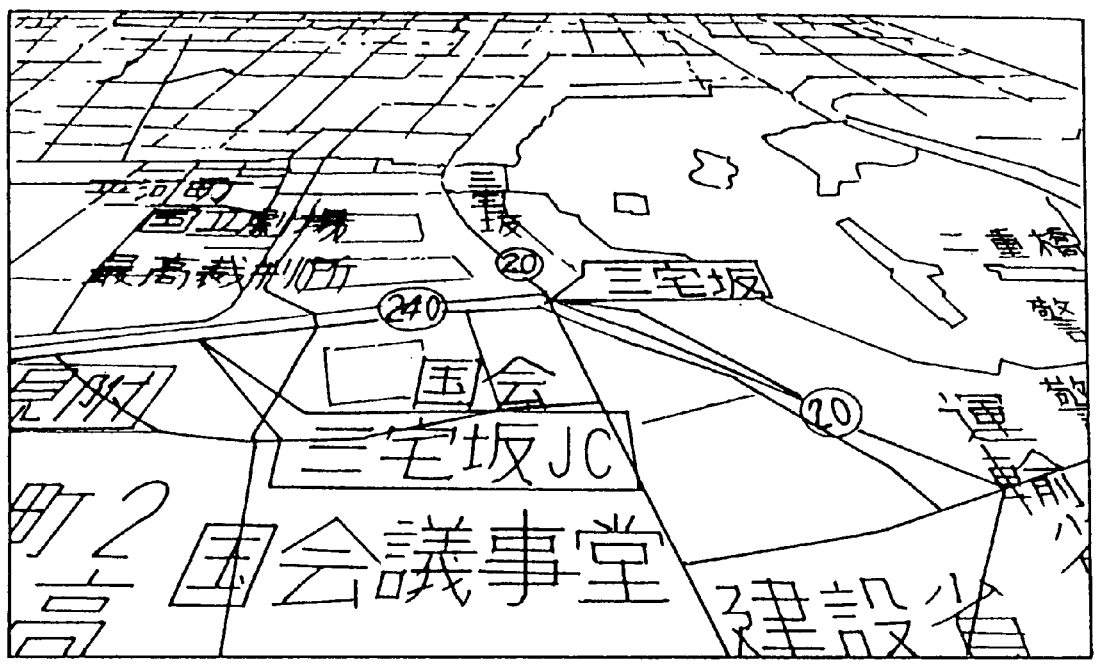
FIG. 9 is an example of the bird's-eye-view display.
Figure 10:
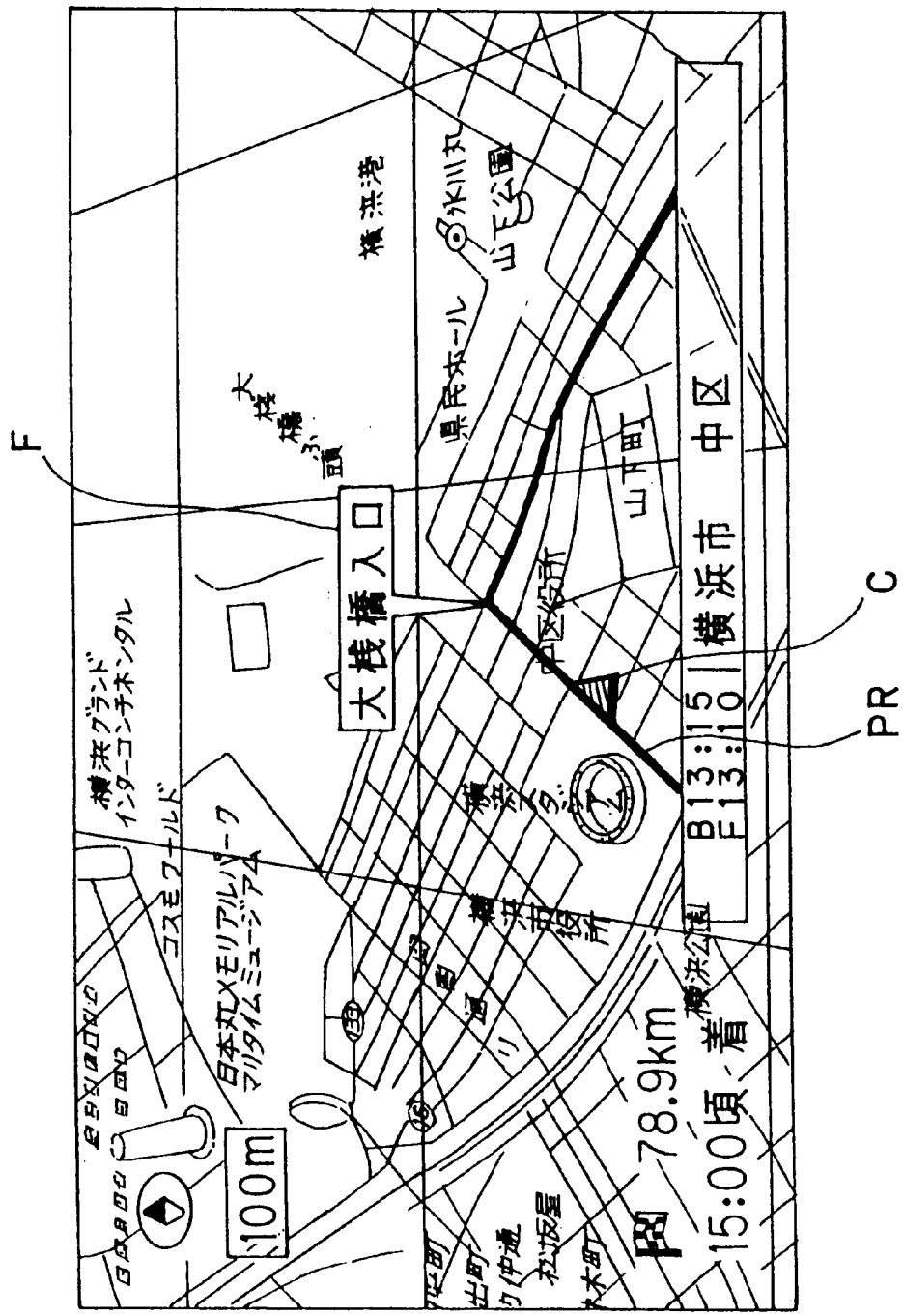
FIG. 10 is another example of the bird's-eye-view display.

As shown in FIG. 7, in the production of the bird's-eye-view character data, first one raw character data (i.e., character data not processed yet) is taken from the character data extracted in step S6 (step S20). Then, the area in which the character data (image font) before the bird's-eye-view conversion is stored is determined on the basis of the number of the character displayed to express a name and the display orientation α (step S21). The processing in step S21 will be described in more detail with reference to FIG. 8A. Referring to FIG. 8A, the display area of the character data (image font) before the bird's-eye-view conversion is determined by one displayed point, e.g., the point (160, 120), set with respect to a reference displayed point, e.g., the point (0,0), on the screen of the display device 16 and the font size (character size of two character sting in the case of FIG. 6A). It is noted that the coordinates at the four corners of the display area shown in FIG. 8A are the example in the case where the font size of one letter (Japanese letter in this example) is 16×16 pixels. According to the method of determining the display described above, the coordinates of the respective displayed points in the display area before the bird's-eye-view conversion are determined based on the number of character sting of the place name and the like to be displayed and the display orientation α.

When the coordinates of the respective displayed points of the display area before the bird's-eye-view conversion are thus determined, it is determined whether or not the character data taken in step S20 corresponds to the character sting which has been designated beforehand by the driver as indicating the targets that the driver should carefully watch during the driving and being stored in the RAM 8 as such designated strings (step S22). If it is the character data corresponding to the designated character sting (step S22;YES), the image font of the character data is displayed as they are (i.e., as normal two dimensional character sting) without applying the bird's-eye-view conversion to them (step S25), and then the process goes to step S26.

On the other hand, if it is not the designated character sting (step S22; NO), it is determined by applying a preset conditions (described later) whether or not the character data corresponds to the character sting to which the driver should pay the attention (step S23). If step S23 results in YES, the process goes to step S25. If step S23 results in NO, the process goes to step S24. Then, the bird's-eye-view conversion is applied to the displayed points at the four corners of the display area of the character data using the equation (2) in a manner similar to that described with reference to FIGS. 5 and 6, and the bird's-eye-view-converted display area as shown in FIG. 8B is calculated. Then, the image font is modified so as to fit in the display area and then displayed within the display area (step S24). Then, the bird's-eye-view-converted character data, shown at the left side of FIG. 8B, thus produced is stored in the RAM 8. Then, it is determined whether or not all character data extracted in step S6 are processed (step S26). If step S26 results in YES, then the process goes to step S9. If step S26 results in NO, then the process returns to step S20 and repeats the processing until all character data is processed. In this way, necessary bird's-eye-view conversion of the character data is completed.

When the bird's-eye-view display processing, shown in FIG. 4 and including steps S7 and S8 described above, is finished, the resultant picture is shown on the display device 16 in which the roads and backgrounds as well as the character data indicating place names, etc. are displayed in the bird's-eye-view manner. If the character sting to be carefully watched have been designated, such character sting (for example, the character string denoted by F in the middle of FIG. 10) is not bird's-eye-view-converted and displayed as the normal two-dimensional feature. It is noted that, in FIG. 10, the current position mark C of the vehicle and the preset route PR along which the vehicle is scheduled to travel are also displayed.

It is noted that, while the examples in FIGS. 8A, 8B, 9 and 10 show the character strings in Japanese letters, the above described processing is similarly applicable to the character stings of other languages such as alphabet. Namely, regardless of the language of the displayed characters or letters, the contrast may be ensured between the designated characters shown in the two dimensional manner and the other (non-designated) characters shown in the bird's-eye-view manner.

Next, the description will be given of the examples of the determination in step S23.

In the first example, the character sting to be displayed (e.g., the character sting predetermined in the route setting, the character sting which indicates important points in the route guidance or the character sting showing the expressway, etc.) on or near the preset route are determined in advance and the time at which the character string is changed from the bird's-eye-view display to the two-dimensional display is also preset. Then, when the preset time arrives, the character string is changed to the two-dimensional display.

In the second example, the character sting belonging to the area where the vehicle is currently passing through may be displayed in the two-dimensional manner. Specifically, if the vehicle is travelling in Saitama-prefecture, the character sting corresponding to the points in the Saitama-prefecture may be changed from the bird's-eye-view display to the two-dimensional display.

In the third example, the character sting which are on the preset route and are present within a predetermined distance range from the current position of the vehicle may be displayed in the two-dimensional manner. In this case, if a certain character string comes in the predetermined distance range from the current vehicle position, the display of the character string is changed from the bird's-eye-view display to the two-dimensional display.

In the fourth example, the character stings which are within a predetermined angle range from the advancing direction of the vehicle may be two-dimensionally displayed. In that case, if a certain character string comes into the predetermined angle range from the vehicle advancing direction, its display is changed from the bird's-eye-view version to the two-dimensional version.

In the fifth example, when traffic information such as traffic jam information is received from VICS (Vehicle Information Communication System) recently practically used, the character sting associated with the received traffic information may be changed into the two-dimensional display.

As described above, according to the vehicle navigation apparatus S of the present invention, if the character string meets one of the above examples or if the character string has been designated by the user in advance, it is not displayed in the bird's-eye-view manner but is displayed in two-dimension manner, thereby making it distinguished and easily recognizable.

While the above described embodiment is directed to the case where the character data is image font, the present invention is applicable to the case where the character data are recorded on the DVD-ROM DK in the form of so-called vector font. Here, the vector font is a font in which the line forming a character or a mark is defined or expressed by coordinates of the start point and end point of the line. More specifically, the vector font of the letter "T" includes the coordinates of the start point and end point of the vertical line as well as the coordinates of the start point and the end point of the horizontal line, wherein those coordinates are defined with respect to a certain reference point. Oblique lines and curved lines forming a part of characters and marks are defined as the combination of the vertical and horizontal lines, and hence the vector font indicating oblique line or curved line is expressed by the coordinates of the start point and the end point of those lines. The bird's-eye-view conversion of such vector font can be achieved by converting the coordinates of the start point and the end point of the lines forming the character or mark according to the equation (2). Further, an emphasis processing such as the edge emphasizing, color change and/or bold character may be used in displaying the character string displayed in the two-dimensional manner.

What is claimed is:

1. An information display device for use in a navigation apparatus to display a map, having map data including character data and route data, to assist travel of a moving object, said device comprising:

data extracting means for extracting character data from the map data;

map data converting means for converting the map data, excluding character data, to bird's-eye-view data;

character data converting means for selecting designated character data from the extracted character data and for converting non-designated extracted character data to bird's-eye-view character data;

combining means for combining the bird's-eye-view character data, the bird's-eye-view map data and the designated character data to produce combined bird's-eye-view data corresponding to at least part of the map; and display means for displaying the at least part of the map using the combined bird's-eye-view data, wherein said designated character data is independent of the route data and corresponds to a character string designated by a user and stored in memory in advance.

2. An information display device according to claim 1, wherein said designated character data is designated in accordance with a current time of said moving object.

3. An information display device according to claim 1, wherein said designated character data is designated in accordance with an area represented on the map where said moving object is travelling.

4. An information display device according to claim 1, wherein said designated character data is designated in accordance with a distance from said moving object.

5. An information display device according to claim 1, wherein said designated character data is designated in accordance with a travelling direction of said moving object.

6. An information display device according to claim 1, wherein said designated character data is designated in accordance with a traffic information supplied from an external unit.

7. A storage medium carrying a program which controls an information display device to display a map having map data including character data and route data, for assisting travel of a moving object, by executing the steps of:

extracting character data from the map data;

converting the map data, excluding character data, to bird's-eye-view map data;

selecting designated character data from the extracted character data and converting non-designated extracted character data to bird's-eye-view character data;

combining the bird's-eye-view character data, the bird's-eye-view map data and the designated character data to produce combined bird's-eye-view data corresponding to at least part of the map; and displaying the at least part of the map using the combined bird's-eye-view data, wherein said designated character data is independent of the route data and corresponds to a character string designated by a user and stored in memory in advance.

8. A storage medium according to claim 7, wherein said designated character data is designated in accordance with a current time of said moving object.

9. A storage medium according to claim 7, wherein said designated character data is designated in accordance with an area represented on the map where said moving object is travelling.

10. A storage medium according to claim 7, wherein said designated character data is designated in accordance with a distance from said moving object.

11. A storage medium according to claim 7, wherein said designated character data is designated in accordance with a travelling direction of said moving object.

12. A storage medium according to claim 7, wherein said designated character data is designated in accordance with a traffic information supplied from an external unit.

13. An information display device for use in a navigation apparatus to display a map having map data including character data and route data to assist travel of a moving object, said device comprising:

data extracting means for extracting character data from the map data;

map data converting means for converting the map data, excluding character data, to bird's-eye-view map data;

character data converting means for selecting designated character data from the extracted character data and for converting non-designated extracted character data to bird's-eye-view character data;

combining means for combining the bird's-eye-view character data, the bird's-eye-view map data and the designated character data to produce combined bird's-eye-view data corresponding to at least part of the map;

a memory device for storing a character string determined in advance by a user; and display means for displaying the at least part of the map using the combined bird's-eye-view data, wherein said designated character data is independent of the route data and corresponds to the character string.

* * * * *